United States Patent [19]
Rocher et al.

[11] 3,873,414
[45] Mar. 25, 1975

[54] PROCESS FOR THE TREATMENT OF BLACK LIQUOR OF CELLULOSIC PULP WHEREIN OXIDATION IS PERFORMED BOTH BEFORE AND AFTER BLACK LIQUOR CONCENTRATION

[75] Inventors: Jacques Rocher, Parly le Chesnay, France; Masamichi Hotta, Mamoru Inomata, Kazuo Hanabusa, all of Kobe, Japan

[73] Assignee: L'Air Liquide, Societe Anonyme Pour l'Etude et Exploitation des Procedes George Claude, Paris, France

[22] Filed: Feb. 22, 1974

[21] Appl. No.: 444,770

Related U.S. Application Data

[63] Continuation-in-part of Ser. No. 300,243, Oct. 24, 1972, abandoned.

[30] Foreign Application Priority Data
Oct. 25, 1971   Japan.............................. 46-83997

[52] U.S. Cl. ............... 162/30, 159/47 WL, 162/31, 210/63, 423/206

[51] Int. Cl...................... D21c 11/04, D21c 11/10
[58] Field of Search ............ 162/30, 31, 65; 210/63; 423/514, 206, 207; 159/47 WL

[56]         References Cited
             UNITED STATES PATENTS
3,549,314   12/1970   Shah .................................. 162/30
3,709,975   1/1973    Amsden et al.................... 162/30 X

*Primary Examiner*—S. Leon Bashore
*Assistant Examiner*—Alfred D'Andrea, Jr.
*Attorney, Agent, or Firm*—Browdy and Neimark

[57]         ABSTRACT

A process for the treatment of black liquor in which in a first oxidation stage there is blown into dilute black liquor a quantity of oxygen ranging from 0.5 to 1 times that theoretically necessary for oxidizing the sodium sulphide to sodium thiosulphate and, in a second oxidation stage, there is blown into black liquor after it has been concentrated a quantity of oxygen greater than that necessary for converting the residual sodium sulphide to sodium thiosulphate. The process is applicable to the recovery of chemical elements, notably from Kraft pulps.

9 Claims, 3 Drawing Figures

PATENTED MAR 25 1975　3,873,414

PROCESS FOR THE TREATMENT OF BLACK LIQUOR OF CELLULOSIC PULP WHEREIN OXIDATION IS PERFORMED BOTH BEFORE AND AFTER BLACK LIQUOR CONCENTRATION

This is a continuation-in-part of Ser. No. 300,243 filed Oct. 24, 1972, now abandoned.

FIELD OF THE INVENTION

This invention relates to the treatment of the black liquor extracted during the manufacture of pulp by the Kraft process and, more particularly, is concerned with a process for recovering useful elements contained in said black liquor.

BACKGROUND OF THE INVENTION

The dilute black liquor extracted, mainly from the digester, during the preparation of Kraft pulp contains various chemical products which have been utilized in or produced during the digestion of wood and there is conventionally provided apparatus for the recovery of the black liquor so as to permit re-utilization of these chemical products. The recovery of these useful chemical products is generally effected by air oxidation.

The dilute black liquor contains sodium sulphide which is liable to be converted during the aforesaid recovery to a nauseous compound such as methyl mercaptan, thereby polluting the atmosphere and discharging a nauseous effluent and, from the economical viewpoint, diminishing the sulphur recovery rate. Consequently, it is desirable to oxidize the sodium sulphide at the highest possible rate during recovery, in order to convert it to sodium thiosulphate and prevent the formation of malodorous compounds.

With air oxidation in the conventional oxidizing tower the rate of oxidation of sodium sulphide is at most 83% and does not as a rule reach 60% and under these conditions the formation of sulphuretted hydrogen is inevitable. With air oxidation, in order to increase the oxidation rate, it is necessary to blow in a considerable quantity of air (for example, in one such process a quantity of air 200 times larger than the quantity of black liquor was consumed), and this makes it necessary for apparatus such as the oxidizing tower and air blower to be large.

SUMMARY OF THE INVENTION

It is, accordingly, an object of this invention to increase the oxidation rate of sulphide present in black liquor.

A further object of the invention is to reduce the production of nauseous compounds during oxidation of sulphide in black liquor.

A still further object of this invention is to increase the rate of sulphur recovery from black liquor.

Another object is to provide for the more efficient and less costly oxidation of sulphide in black liquor.

According to the invention there is provided a process for the treatment of black liquor formed during the pulping of cellulosic materials by the Kraft Process, so as to oxidize sulphide present in the black liquor to facilitate recovery of useful chemical elements which the black liquor contains, the improvement which comprises:

a. in a first oxidation stage, blowing into dilute black liquor a quantity of oxygen which is from 0.5 to 1 times that quantity of oxygen theoretically necessary to convert by oxidation to sodium thiosulphate the sodium sulphide present in the black liquor, whereby a partial oxidation of the sodium sulphide to sodium thiosulphate is effected;

b. thereafter concentrating the said dilute black liquor so as to obtain a concentrated black liquor; and c. in a second oxidation stage, blowing into the said concentrated black liquor a quantity of oxygen greater than that quantity of oxygen theoretically necessary to convert by oxidation to sodium thiosulphate the residual sodium sulphide in the said concentrated black liquor.

In the first oxidation stage, a quantity of oxygen which is from 0.5 to 1 times that necessary to convert the sodium sulphide contained in the dilute black liquor to sodium thiosulphate is blown into the black liquor and in the second oxidation stage there is blown into the concentrated black liquor a quantity of oxygen greater than that theoretically necessary for converting to sodium thiosulphate the sodium sulphide which has not been oxidized in the first oxidation stage and which remains in the concentrated black liquor, such quantities preferably being 1.1 to 1.5 times the oxygen theoretically necessary.

We have found that in order to obtain the complete oxidation of the sodium sulphide with a low consumption of oxygen, the oxidation of black liquor advantageously is effected in two stages. In the first stage, in which black liquor is treated, oxidation is effected under conditions which place emphasis on the yield achieved with respect to utilization rather than on the oxidation rate with reduced oxygen consumption. Thereafter the black liquor, the sodium sulphide content of which has been diminished, is subjected to further concentration by vaporization. In the second oxidation stage, in which the previously obtained concentrated black liquor is treated, the process is effected under conditions which lead to or approach total oxidation, rather than optimum yield in respect of oxygen utilization, so as to oxidize all the remaining non-oxidized sodium sulphide.

In order to achieve these effects, it has been found that there should be blown into the black liquor in the first oxidation stage (dilute black liquor) a quantity of oxygen which ranges from 0.5 to 1 times that necessary for oxidizing the sodium sulphide contained in the dilute black liquor to convert it to sodium thiosulphate. Then, in the second oxidation stage (concentrated black liquor) there should be blown into the black liquor a quantity of oxygen larger than that necessary for oxidizing the residual sodium sulphide in the concentrated black liquor, to convert it to sodium thiosulphate, preferably 1.1 to 1.5 times that necessary.

BRIEF DESCRIPTION OF DRAWING

The objects recited hereinbefore and other objects of the invention will be more clearly understood from the following in which there is described the operation of an installation in which there is effected a conventional process for the recovery of black liquor and an exemplary operation of an installation in which the black liquor is treated by the process according to the invention. In the following description reference is made to the accompanying drawings in which.

DESCRIPTION OF PREFERRED EMBODIMENTS

The oxidation rate is increased by employing oxygen or air which is rich in oxygen, in place of air alone. Thus satisfactory results are also obtained when the dilute black liquor is subject to oxidation in a first stage in the manner described above, followed by concentration such as by vaporization and this then being followed by oxidation with pure oxygen, under the same conditions as the first oxidation but using relatively more oxygen.

In one embodiment of the invention, a conventional air oxidation procedure is combined with oxygen oxidation; in view of the fact that there is achieved, in the dilute black liquor stage, oxidation with a high yield with a relatively small oxygen consumption, by limiting the sodium sulphide oxidation to 80%, it is possible to envisage replacing the oxygen operation by air oxidation, if the question of enlargement of the plant required is left out of consideration. In fact, it is possible to achieve oxidation of sodium sulphide of the order of 80% on operating under the best conditions with carefully selected apparatus. On blowing into the black liquor concentrated by vaporization after air oxidation, a quantity of oxygen greater than that necessary for converting the sodium sulphide to sodium thiosulphate, it becomes possible to achieve complete oxideation of the sodium sulphide contained in the aforesaid liquor.

The process of the invention can be carried into effect with pure oxygen, such as high purity liquid oxygen, but it is possible to utilize oxygen-enriched air.

Figure 1:
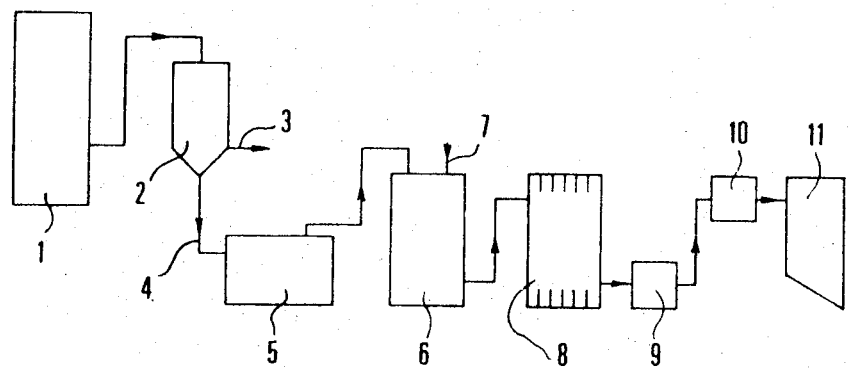
FIG. 1 is a diagrammatic representation of an installation for the recovery of black liquor.

Referring to FIG. 1 showing a conventional operation, the before of pulp and black liquor evacuated from a digester 1 is supplied to a reservoir 2 where a separation is effected. The pulp is evacuated through a conduit 3 and the black liquor through a conduit 4. The black liquor which is supplied to a tank 5 through the conduit 4 is contacted in an oxidation tower 6 with air flowing through a conduit 7, to permit oxidation of the chemical products contained in the black liquor. Then the black liquor is concentrated by vaporization in a multiple-action vaporizer 8 before being supplied to a tank 9 (the liquor begore concentration being known as dilute black liquor). Before entering a recuperator 11, the concentrated black liquor is subjected to more thorough concentration in a direct contact vaporizer 10 where it is directly contacted with the gas flowing out of the dust extractor downstream of the recuperator 11, after which it is heated in the recuperator 11 from which the chemical products are extracted in the solid state. Generally, the dilute black liquor has the following characteristics:

| | |
|---|---|
| Solid elements | 15 – 16% |
| Temperature | 80 – 85°C |
| pH | 12 – 13 |
| $Na_2S$ content | 7 – 10 g/l |

Figure 2:
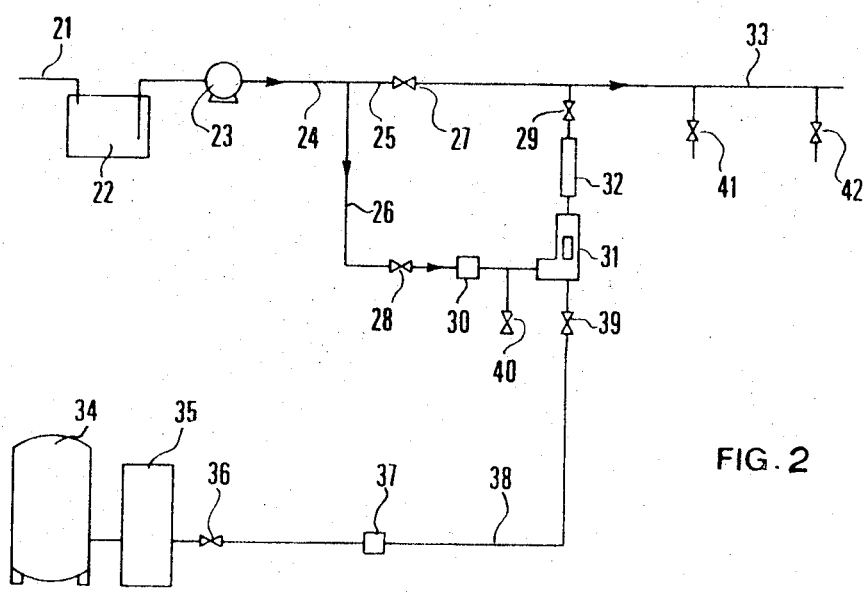
FIG. 2 is a diagrammatic representation of a non-limitative example of the oxidation of dilute black liquor according to the invention.

In the embodiment of the present invention as shown in FIG. 2, the dilute black liquor evacuated from the digester, after separation from the pulp, is fed first of all to a tank 22 through a conduit 21 and is then discharged into a conduit 24 by a pump 23. The conduit 24 is divided into two circuits 25 and 26. Inversion of the circuit and regulation of the flow rate are effected by valves 27, 28 and 29.

The dilute black liquor circulating in the conduit 26 passes through the valve 28 and a flowmeter 30 and enters an oxygen reactor 31 into which is blown the oxygen from a conduit 38. The oxygen reactor 31 is designed so as to permit an increase in the yield of the mixture of liquid and gas, as indicated hereinbelow, but mixing may be further facilitated by connecting a mixer 32 in the downstream conduit. The dilute black liquor, after having been mixed with the oxygen in the oxygen reactor 31 and possibly also in the mixer 32, flows into a conduit 33 where the sodium sulphide which it contains is oxidized with high yield, and converted to sodium thiosulphate. The conduit 33, which is connected to the duct 25, then routes the dilute black liquor to a multiple-action vaporizer (not shown) where concentration by vaporization of the black liquor takes place.

On the other hand, liquid oxygen obtained from a reservoir 34, after vaporization in a vaporizer 35, is introduced into the oxygen reactor 31 through a conduit 38 and through a valve 39, after passing through an expander 36 and a flow meter 37. Valves 40, 41 and 42 are provided for extracting samples.

The process described above relates to the oxidation of the dilute black liquor, but it is possible to proceed in exactly the same manner in order to oxidize the concentrated black liquor.

There was carried out a first series of examples involving oxidation with pure oxygen by circulating the dilute black liquor in the conduit 26 along the flow path indicated in FIG. 2, and the sodium sulphide content of samples taken-off by sampling means 40, 41 and 42 was analyzed by means of the TAPPI T625-TS-64 method. The sampling means 40 is disposed upstream of the oxygen reactor 31, and the sample taken off for analysis supplies the sodium sulphide content before oxidation. The valves 41 and 42 are disposed approximately 15 m and 200 m respectively downstream of the oxygen reactor. In this way, the oxidation in the conduit 33 may be followed.

The results obtained are shown in the following Table:

| Test No. | Dilute black liquor flow rate $(m^3/h)$ | (A) $Na_2S$ flow rate (kg/h) | (B) $O_2$ gas flow rate $(m^3/h)$ | (C) Theoretical quantity of oxygen necessary for A $(m^3/h)$ | B/C | \multicolumn{3}{c}{$Na_2S$ content of the dilute black liquor (g/l)} | Oxidation rate taux (strength) (%) | $O_2$ utilizat. yield % |
|---|---|---|---|---|---|---|---|---|---|---|
| | | | | | | Valve 40 | Valve 41 | Valve 42 | | |
| 1 | 70 | 573 | 215 | 230 | 0.94 | 8.18 | 6.08 | 1.87 | 77 | 83 |
| 3 | 90 | 655 | 375 | 263 | 1.43 | 8.18 | 3.74 | 1.40 | 82 | 58 |
| 5 | 43 | 386 | 150 | 155 | 0.97 | 8.57 | 6.2 | 1.79 | 78 | 82 |
| 6 | 66 | 613 | 180 | 246 | 0.73 | 9.29 | 2.60 | 2.42 | 74 | 100 |
| 7 | 66 | 402 | 280 | 156 | 1.79 | 5.9 | 1.7 | 0.1 | 100 | 56 |
| 9 | 58 | 485 | 300 | 195 | 1.5 | 8.38 | 4.04 | 0.1 | 100 | 65 |
| 10 | 70 | 600 | 600 | 190 | 0.79 | 8.57 | 6.2 | 0.82 | 91 | 100 |
| 12 | 61 | 504 | 504 | 200 | 1.0 | 8.26 | 4.35 | 1.32 | 84 | 85 |

The table shows that, in order to increase the oxidation rate, it is necessary to blow in a quantity of oxygen which is larger than that theoretically necessary. Nevertheless, it should also be noted that the blowing-in of a large quantity of oxygen decreases the oxygen utilization efficiency. On comparing the results obtained in the experiments with oxygen and without oxygen, it has been noted that the oxygen utilization efficiency may be improved by installing a mixer downstream of the oxygen reactor.

In order to obtain complete oxidation of the sodium sulphide with a comsumption of oxygen which is substantially reduced, oxidation of the black liquor should be effected in two stages. In the first oxidation stage, in which the dilute black liquor is treated, oxidation is effected while placing the emphasis on the oxygen utilization efficiency rather than on the oxidation rate with reduced oxygen consumption, and the black liquor, the sodium sulphide content of which is reduced, will be concentrated by vaporization. In the second oxidation stage, in which the concentrated black liquor is obtained in the above discussed fashion by heating, the operation is carried into effect having in view complete oxidation rather than endeavoring to achieve the optimum efficiency in respect of oxygen utilization, so as to oxidize all the sodium sulphide remaining non-oxidized.

In order to obtain the aforesaid result, there is blown into the dilute black liquor in the first oxidation stage a quantity of oxygen ranging from 0.5 to 1 times that necessary for oxidizing the sodium sulphide contained in the dilute black liquor in order to convert it to sodium thiosulphate, all other operating conditions being those conventionally used and known to those having normal skill in the art. Then, in the second oxidation stage (concentrated black liquor), there is blown into the black liquor a quantity of oxygen larger than that necessary for oxidizing the sodium sulphide remaining in the concentrated black liquor to convert it to sodium thiosulphate, once again the other operating conditions (except for oxygen quantity) being selected from conventional conditions known in the prior art.

There has furthermore been effected a second series of examples wherein first of all the dilute black liquor has been subjected to oxygen oxidation corresponding to the first stage as hereinabove described in relation to FIG. 2 and then the black liquor concentrated by vaporization is subjected to pure oxygen oxidation under the same conditions as before but using more than the theoretical quantity of oxygen. The results obtained were satisfactory, as could be expected.

These results have led to a study of the possibilities for combining conventional air oxidation with oxygen oxidation. Since there is obtained, in the dilute black liquor stage, high efficiency oxidation with a relatively low oxygen consumption, limiting the sodium sulphide oxidation to 80%, it is possible to replace the operation by air oxidation if the question of enlargement of the installation is left out of consideration. In fact, as before, it is possible to achieve, by employing air, a degree of oxidation of the sodium sulphide of the order of 80% on operating under the best possible conditions with carefully selected apparatus (or material). Thus, it is certain that, by blowing into the black liquor concentrated by vaporization, after air oxidation, a quantity of oxygen larger than that necessary for converting the sodium sulphide to sodium thosulphate, it is possible to effect complete oxidation of the sodium sulphide contained in the aforesaid liquor.

A third series of examples were effected with a vertical tubular reactor of small size containing 10 liters of black liquor which was first oxidized to reduce the total $Na_2S$ content and then concentrated to reduce its volume, thereby increasing the concentration of the remaining $Na_2S$. A tube descending into the reactor to near the bottom of the so partially oxidized and concentrated liquor terminated in an end of porous material serving as a diffuser for the oxygen passing from the tube in such a manner such that the oxidation of the remaining $Na_2S$ was obtained by the oxygen injected into the concentrated black liquor mass in the form of bubbles.

The examples were repeated several times varying the quantity of oxygen as indicated in the table below. The results show that furnishing a quantity of oxygen 1.1–1.5 greater than the theoretical necessary quantity for oxidation of the $Na_2S$ provides an elevated rate of oxidation of 60–85%.

While these examples were effected on a laboratory scale and it was thus possible only to obtain the oxidation rate of 85% maximum, if the operation were conducted in a continuous phase on an industrial scale, as in the case of diluted black liquor, installing a mixer in the tube in such a manner as to assure good contact between the oxygen and the concentrated black liquor, it would be possible to obtain a rate of oxidation still greater.

| Example | Before Oxidation $Na_2S$ (g/l) | Before Oxidation $Na_2S$ Total (g) | $O_2$ (g) | Ratio (1) | After Oxidation $Na_2S$ (g) | Rate of oxidation of $Na_2S$ (%) |
|---|---|---|---|---|---|---|
| 1 | 2.3 | 23 | 12.1 | 0.8 | 16 | 30 |
| 2 | 2.2 | 22 | 14.4 | 1.0 | 11 | 50 |
| 3 | 2.2 | 22 | 18.2 | 1.3 | 5 | 78 |
| 4 | 1.9 | 19 | 13.7 | 1.1 | 8 | 58 |
| 5 | 1.9 | 19 | 15.0 | 1.2 | 6 | 68 |
| 6 | 2.3 | 23 | 16.5 | 1.1 | 10 | 56 |
| 7 | 1.9 | 19 | 16.3 | 1.3 | 3 | 84 |
| 8 | 1.6 | 16 | 9.4 | 0.9 | 7 | 55 |
| 9 | 4.0 | 40 | 39.2 | 1.5 | 4 | 90 |
| 10 | 11.0 | 110 | 94 | 1.3 | 18 | 83 |

(1) Ratio of theoretical quantity of oxidation necessary for the oxidation of $Na_2S$.

| Notation | Temperature | 95°C |
| --- | --- | --- |
| | Time of oxygen injection | 5 minutes |
| | Time of retention after stopping injection of oxygen | 5 minutes |

Figure 3:
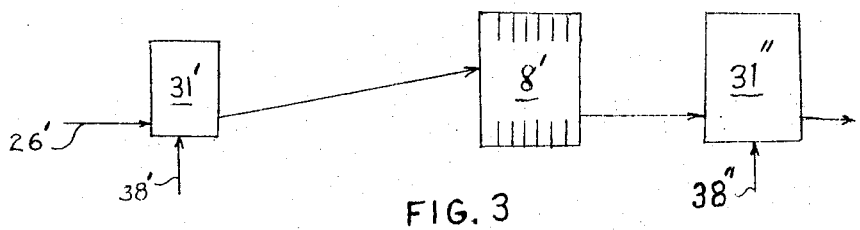
FIG. 3 is a schemmatic representation of another system of the present invention.

Referring to FIG. 3, the dilute black liquor is fed through conduit 26' to a first oxygen reactor 31'. Oxygen, air or oxygen enriched air is then fed through the line 38' into the reactor 31' under conventional conditions and in a quantity of 0.5 to 1.0 times the quantity necessary to theoretically react with all the sulphide present in the dilute black liquor. The partial reaction is carried out using known reaction conditions, such as those which would be used in the installation of FIG. 1 (e.g., 50°–150°C; 2–20 kg/cm$^2$; contact time 2–15 minutes).

The partially oxidized dilute black liquor is then fed to a conventional concentrator, such as the multiple-section vaporizer 8' where the black liquor is concentrated under conventional conditions in the known manner to provide a concentration of about 1.5 to 15 g/l of sulphide. The resultant concentrated black liquor, partially oxidized, is then passed to a second oxygen reactor 31'' (or it could be recirculated to the first reactor 31') where air, oxygen or oxygen enriched air is fed in a quantity in excess of the quantity theoretically necessary to complete the oxidation, preferably 1.1 to 1.5 times the theoretical oxygen quantity necessary. The reaction is carried out under conventional conditions (e.g., 50°–150° C; 2–20 kg/cm$^2$; contact time 2–15 minutes).

It is to be understood that this invention can be embodied in a number of forms different from those specifically described without departing from the spirit or essential characteristics thereof. The embodiments described and illustrated herein are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. In a process for the treatment of black liquor formed during the pulping of cellulosic materials by the Kraft process, so as to oxidize sulfide present in the black liquor to facilitate recovery of useful chemical elements which the black liquor contains, comprising:
   blowing oxygen into the black liquor removed from the Kraft process after separation of the pulp therefrom, and then concentrating by vaporization the oxygen treated black liquor to obtain a relatively concentrated black liquor of about 1.5 to 15 g/l sulfide, the improvement comprising:
   effecting the blowing of oxygen into the black liquor in two separate stages;
   the first said stage being prior to said concentration step and wherein the quantity of oxygen blown into the black liquor is from 0.5 to 1 times that quantity of oxygen theorectically necessary to convert by oxidation to sodium thiosufate that sodium sulfide present, whereby part of the sodium sulfide in the black liquor is oxidized to sodium thiosulfate;
   the second said stage being after said concentration step and wherein the quantity of oxygen blown into the black liquor is about 1.1 to 1.5 times greater than that quantity of oxygen theoretically necessary to convert by oxidation to sodium thiosulfate the residual sodium sulfide in the black liquor.

2. A process according to claim 1, wherein the oxygen which is blown into the said black liquor in the first oxidation stage is formed by vaporizing liquid oxygen.

3. A process according to claim 1, wherein the oxygen which is blown into the said black liquor in the first oxidation stage is in the form of oxygen-enriched air.

4. A process according to claim 1, wherein the oxygen which is blown into the said black liquor in the first oxidation stage is in the form of air.

5. A process according to claim 1, wherein the oxygen which is blown into the said black liquor in the second oxidation stage is obtained by vaporizing liquid oxygen.

6. A process according to claim 1, wherein the oxygen which is blown into the said black liquor in the second oxidation stage is in the form of oxygen-enriched air.

7. A process according to claim 2, wherein the oxygen which is blown into the said black liquor in the second oxidation stage is obtained by vaporizing liquid oxygen.

8. A process according to claim 3, wherein the oxygen which is blown into the said black liquor in the second oxidation stage is in the form of oxygen-enriched air.

9. In a process for the treatment of black liquor separated from cellulosic pulp produced by the Kraft process, so as to oxidize sulphide present in the black liquor with a view to recovering useful chemical elements which the black liquor contains, the steps comprising
   a. in a first oxidation stage, blowing into black liquor leaving the Kraft process, 0.5 to 1 times the quantity of oxygen necessary to theoretically oxidize all the sodium sulfide to sodium thiosulfate to thereby oxidize a portion of the sodium sulphide present in the black liquor;
   b. then concentrating the dilute black liquor to give a concentrated black liquor of about 1.5 to 15 g/l sulfide; and,
   c. in a second oxidation stage following said concentrating step, blowing into the said concentrated black liquor a quantity of oxygen which is about 1.1 to 1.5 times greater than that quantity of oxygen necessary to convert by oxidation to sodium thiosulphate the residual sulphide in the said concentrated black liquor.

* * * * *